(12) United States Patent
Wang et al.

(10) Patent No.: US 9,799,376 B2
(45) Date of Patent: Oct. 24, 2017

(54) METHOD AND DEVICE FOR VIDEO BROWSING BASED ON KEYFRAME

(71) Applicant: Xiaomi Inc., Beijing (CN)

(72) Inventors: Baichao Wang, Beijing (CN); Qiuping Qin, Beijing (CN); Wendi Hou, Beijing (CN)

(73) Assignee: Xiaomi Inc., Bejing (CN)

( * ) Notice: Subject to any disclaimer, the term of this patent is extended or adjusted under 35 U.S.C. 154(b) by 249 days.

(21) Appl. No.: 14/696,691

(22) Filed: Apr. 27, 2015

(65) Prior Publication Data

US 2016/0078297 A1 Mar. 17, 2016

Related U.S. Application Data

(63) Continuation of application No. PCT/CN2015/071247, filed on Jan. 21, 2015.

(30) Foreign Application Priority Data

Sep. 17, 2014 (CN) .......................... 2014 1 0475165

(51) Int. Cl.
*H04N 9/80* (2006.01)
*G11B 27/34* (2006.01)
*G11B 27/30* (2006.01)
*G11B 27/11* (2006.01)
*G11B 27/10* (2006.01)

(52) U.S. Cl.
CPC ............ *G11B 27/34* (2013.01); *G11B 27/105* (2013.01); *G11B 27/11* (2013.01); *G11B 27/3081* (2013.01)

(58) Field of Classification Search
CPC ........... G06K 9/00711; G06K 9/00751; H04N 19/142; H04N 5/144; H04N 5/147; G11B 27/34; G11B 27/3081; G11B 27/11; G11B 27/105
USPC ........................................................ 386/241
See application file for complete search history.

(56) References Cited

U.S. PATENT DOCUMENTS

| 5,459,517 | A | * | 10/1995 | Kunitake ............... | H04N 5/144 348/700 |
| 5,635,982 | A | | 6/1997 | Zhang et al. | |
| 5,732,146 | A | | 3/1998 | Yamada et al. | |
| 5,793,886 | A | | 8/1998 | Cok | |

(Continued)

FOREIGN PATENT DOCUMENTS

| CN | 1444398 A | 9/2003 |
| CN | 101076111 A | 11/2007 |

(Continued)

OTHER PUBLICATIONS

International Search Report of PCT Application No. PCT/CN2015/071247, mailed Jun. 30, 2015, issued by the State Intellectual Property Office of P.R. China as ISA (4 pages).

(Continued)

*Primary Examiner* — David Harvey
(74) *Attorney, Agent, or Firm* — Finnegan, Henderson, Farabow, Garrett & Dunner LLP (57) ABSTRACT

A method for video browsing includes comparing a current image frame with a previous image frame prior to the current image frame in a video to obtain target block information, identifying the current image frame as a keyframe if the target block information satisfies a predetermined condition, and playing the keyframe.

18 Claims, 4 Drawing Sheets

(56) References Cited

U.S. PATENT DOCUMENTS

| | | | |
|---|---|---|---|
| 6,385,386 B1 | 5/2002 | Aotake | |
| 6,393,054 B1 | 5/2002 | Altunbasak et al. | |
| 6,549,643 B1* | 4/2003 | Toklu | G06F 17/30802 348/571 |
| 7,127,120 B2* | 10/2006 | Hua | G11B 27/28 348/616 |
| 7,843,512 B2 | 11/2010 | Mohamed et al. | |
| 8,195,038 B2* | 6/2012 | Liu | G11B 27/034 386/344 |
| 8,208,792 B2* | 6/2012 | Morioka | G11B 27/034 386/248 |
| 8,243,790 B2* | 8/2012 | Leontaris | H04N 19/105 375/240.02 |
| 8,411,902 B2* | 4/2013 | Obrador | G06T 7/20 382/107 |
| 8,527,247 B1* | 9/2013 | Wilson | G05B 11/06 416/36 |
| 8,818,037 B2* | 8/2014 | Noorkami | G06K 9/00744 382/103 |
| 2003/0091235 A1* | 5/2003 | Xiong | G06F 17/30802 382/199 |
| 2005/0046699 A1 | 3/2005 | Oya et al. | |
| 2005/0226331 A1* | 10/2005 | Mohamed | G06F 17/30811 375/240.16 |
| 2005/0228849 A1* | 10/2005 | Zhang | G06F 17/30787 709/200 |
| 2006/0036948 A1 | 2/2006 | Matsuzaka | |
| 2006/0193387 A1* | 8/2006 | Wu | G06F 17/30811 375/240.16 |
| 2007/0182861 A1* | 8/2007 | Luo | G11B 27/28 348/700 |
| 2007/0237225 A1 | 10/2007 | Luo et al. | |
| 2007/0263128 A1* | 11/2007 | Zhang | G11B 27/28 348/700 |
| 2008/0232687 A1* | 9/2008 | Petersohn | G06F 17/30802 382/173 |
| 2009/0080853 A1* | 3/2009 | Chen | G06F 17/30787 386/241 |
| 2009/0083781 A1* | 3/2009 | Yang | G06F 17/30781 725/20 |
| 2009/0225169 A1 | 9/2009 | Wang | |
| 2010/0189252 A1* | 7/2010 | Jacob | G06T 3/4092 380/28 |
| 2010/0201691 A1 | 8/2010 | Li et al. | |
| 2011/0135286 A1* | 6/2011 | Moon | G11B 27/28 386/330 |
| 2012/0027295 A1* | 2/2012 | Shao | G06F 17/30781 382/170 |
| 2013/0251274 A1* | 9/2013 | Xie | G06K 9/6202 382/218 |
| 2014/0133548 A1* | 5/2014 | Mate | H04N 9/8205 375/240.02 |
| 2014/0233800 A1 | 8/2014 | Kis et al. | |

FOREIGN PATENT DOCUMENTS

| | | |
|---|---|---|
| CN | 101076115 A | 11/2007 |
| CN | 101184226 | 5/2008 |
| CN | 101360184 A | 2/2009 |
| CN | 101369281 A | 2/2009 |
| CN | 101398855 A | 4/2009 |
| CN | 101479729 A | 7/2009 |
| CN | 101820416 A | 9/2010 |
| CN | 102348115 A | 2/2012 |
| CN | 102867055 A | 1/2013 |
| CN | 102932619 A | 2/2013 |
| CN | 102982828 A | 3/2013 |
| CN | 103200463 A | 7/2013 |
| CN | 103345492 A | 10/2013 |
| CN | 103533237 A | 1/2014 |
| CN | 103606158 A | 2/2014 |
| CN | 104284240 A | 1/2015 |
| EP | 0 660 327 A2 | 6/1995 |
| EP | 0690413 A2 * | 1/1996 |
| EP | 1 043 664 A2 | 10/2000 |
| EP | 2 568 440 A1 | 3/2013 |
| JP | 2001527304 A | 12/2001 |
| JP | 2009077256 A | 4/2009 |
| JP | 2010258768 A | 11/2010 |
| JP | 2012010265 A | 1/2012 |
| JP | 2014006912 A | 1/2014 |
| JP | 2014030260 A | 2/2014 |
| KR | 1020070017068 | 2/2007 |
| KR | 20110063004 A | 6/2011 |
| RU | 2011 128 228 A | 7/2011 |

OTHER PUBLICATIONS

Extended Search Report for European Application No. 15185682.0 from the European Patent Office, dated Feb. 9, 2016.
C. H. Huang et al., *Human Shape and Pose Tracking Using Keyframes*, CVPR 2014—IEEE International Conference on Computer Vision and Pattern Recognition, Jun. 2014. 9 pages.
D. Tancharoen et al., *Wearable Video Retrieval and Navigation System using GPS Data*, (Abstract) 2010 10th IEEE International Conference, Jun. 29-Jul. 1, 2010, 1 page.
English version of International Search Report of PCT Application No. PCT/CN2015/071247, mailed Jun. 30, 2015, issued by the State Intellectual Property Office of P.R. China as ISA (2 pages).

* cited by examiner

METHOD AND DEVICE FOR VIDEO BROWSING BASED ON KEYFRAME

This application is a continuation of International Application No. PCT/CN2015/071247, filed Jan. 21, 2015, which is based upon and claims priority to Chinese Patent Application No. 201410475165.4, filed Sep. 17, 2014, the entire contents of both of which are incorporated herein by reference.

TECHNICAL FIELD

The present disclosure relates to computer technology and, more particularly, to a method and device for video browsing.

BACKGROUND

Nowadays, more and more videos have been transmitted through a network. Sometimes people may need to quickly browse a network video to know the contents of the video. A video includes image frames, among which keyframes can be extracted and reproduced on a screen at a proper rate, so as to realize video browsing. During the process of extracting keyframes, a terminal segments the video into at least two shots. A group of keyframes are selected for each shot in response to changes of image quality and video contents according to boundaries of the shot.

SUMMARY

In accordance with the present disclosure, there is provided a method for video browsing. The method includes comparing a current image frame with a previous image frame prior to the current image frame in a video to obtain target block information, identifying the current image frame as a keyframe if the target block information satisfies a predetermined condition, and playing the keyframe.

Also in accordance with the present disclosure, there is provided a device for video browsing. The device includes a processor and a non-transitory computer-readable storage medium storing instructions. The instructions, when executed by the processor, cause the processor to compare a current image frame with a previous image frame prior to the current image frame in a video to obtain target block information, identify the current image frame as a keyframe if the target block information satisfies a predetermined condition, and play the keyframe.

Also in accordance with the present disclosure, there is provided a non-transitory readable storage medium storing instructions. The instructions, when executed by a processor in a terminal, cause the terminal to compare a current image frame with a previous image frame prior to the current image frame in a video to obtain target block information, identify the current image frame as a keyframe if the target block information satisfies a predetermined condition, and play the keyframe.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims. The methods and devices according to the present disclosure may be implemented in a terminal.

Figure 1:
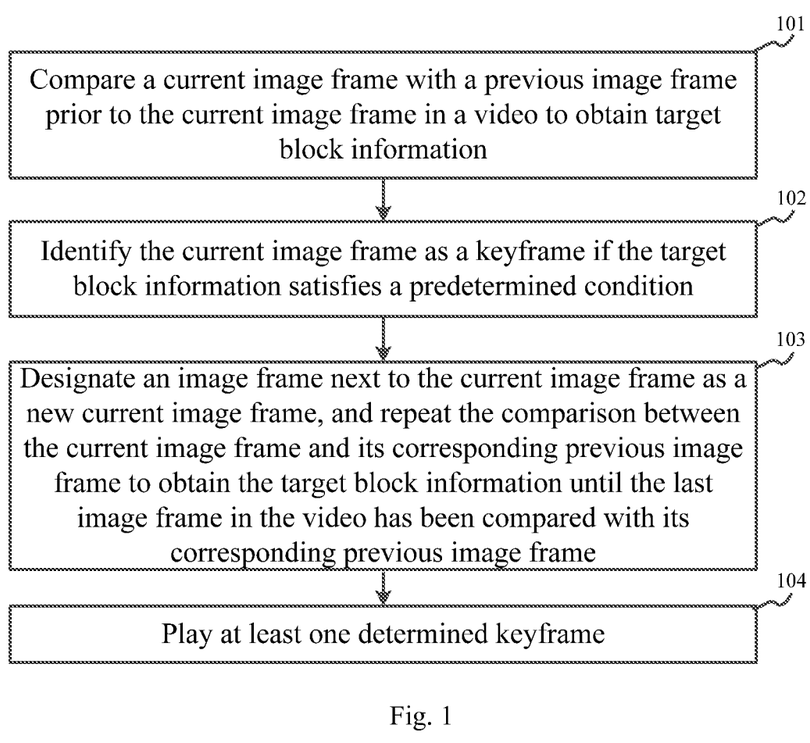
FIG. 1 is a flow chart showing a method for video browsing, according to an exemplary embodiment.

FIG. 1 is a flow chart showing an exemplary method for video browsing consistent with the present disclosure. As shown in FIG. 1, at 101, a current image frame and a previous image frame prior to the current image frame in a video are compared to obtain target block information. Consistent with the present disclosure, an image frame is a unit image of the video and each image frame contains at least one target block obtained by dividing the contents in the image frame. A target block may include at least one object or a part of an object. In some embodiments, the target block information is obtained by comparing the at least one target block in the current image frame with the at least one target block in the previous image frame prior to the current image frame.

At 102, the current image frame is identified as a keyframe if the target block information satisfies a predetermined condition. A keyframe is an image frame containing an object or a key action in the movement of the object in the entire video. The keyframe may represent the video content during a time period in the video. Since an object in an image frame can be represented by a target block and target block information can be used to represent changes between the target blocks in two adjacent image frames, the terminal can detect whether an image frame is a keyframe according to the target block information so as to extract at least one keyframe from the video.

At 103, an image frame next to the current image frame is designated as a new current image frame, and the old current image frame now becomes a previous image frame of the new current image frame prior to the new current image frame. Thereafter, the new current image frame is compared with its corresponding previous image frame to obtain new target block information.

The above-described process is repeatedly performed until the last image frame in the video has been compared with its corresponding previous image frame. That is, according to the present disclosure, all image frames may be subject to the comparison process to extract all the keyframes in the video.

At 104, at least one identified keyframe is played.

Since each keyframe may represent the video contents during a time period, by playing at least one identified keyframe in the terminal, such as on a screen of the terminal, at a proper speed in sequence, the duration of playing the video can be shortened without jeopardizing the effective information to be delivered by the video. As a result, the video contents may be quickly browsed, and the video playing efficiency may be improved.

Figure 2:
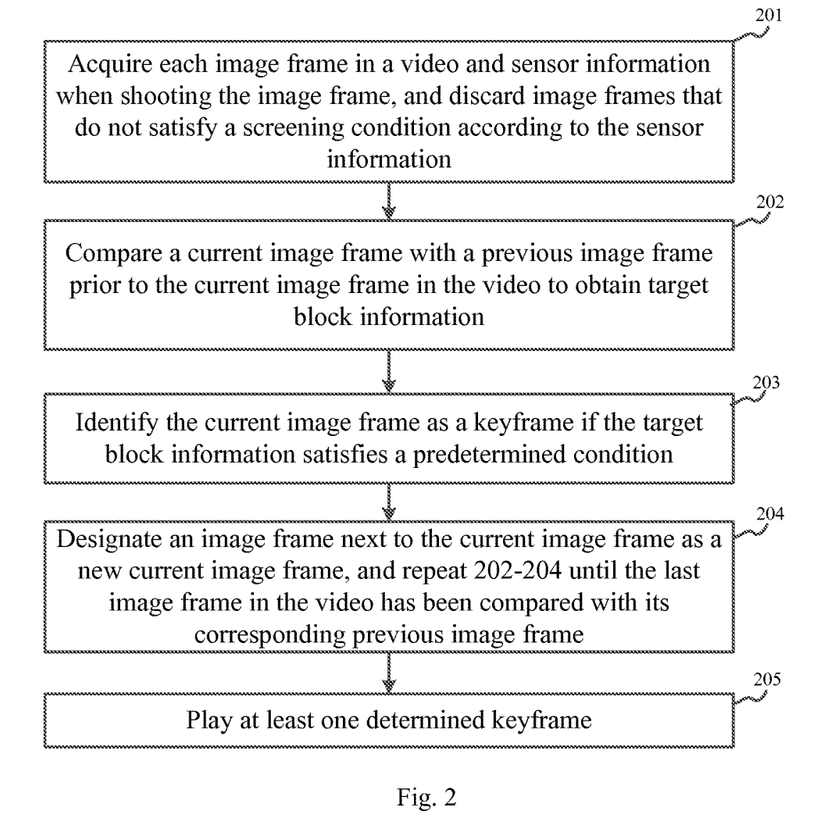
FIG. 2 is a flow chart showing a method for video browsing, according to another exemplary embodiment.

FIG. 2 is a flow chart showing another exemplary method for video browsing consistent with the present disclosure. As shown in FIG. 2, at 201, each image frame in the video and sensor information when shooting the image frame are acquired. The sensor information includes at least one of Global Positioning System (GPS) information, acceleration information, or ISO sensitivity information. An image frame is discarded if it does not satisfy a screening condition according to the sensor information.

In the method shown in FIG. 2, the process described above at 201 is optional. That is, after a terminal obtains a video through a camera, the terminal can directly perform the process described below at 202-205, or screen the image frames in the video and discard the image frames satisfying a discarding condition. The process described below in connection with 202-205 then initiates with designating one of the remaining image frames as the current image frame. By discarding certain image frames, these image frames do not need to undergo later processing, such that the waste of resources is reduced and the efficiency of processing the image frames is improved.

The terminal may set different discarding conditions according to different sensor information. For example, if the sensor information is the GPS information, the shooting scene may include shooting the video during movement. If the terminal stays at the same geographical position for a long time, the image frames shot may be similar to each other. In this scenario, the discarding condition may be set as follows: when the video is shot during movement, if the GPS information of the image frame and the GPS information of the previous image indicate a distance smaller than a GPS threshold, then that image frame is discarded. If the sensor information is the acceleration information, the shooting scene may include shooting the video during movement. If the terminal moves at a relatively large acceleration, the image frames shot may be blurred. In this scenario, the discarding condition may be set as follows: the image frame having an acceleration larger than an acceleration threshold is discarded. If the sensor information is the ISO information, then the image frame shot with a relatively high ISO has a relatively large amount of noises. In this scenario, the discarding condition may be set as follows: the image frame having an ISO larger than an ISO threshold is discarded. If the sensor information includes at least two of the GPS information, the acceleration information, or the ISO information, the terminal may combine the respective discarding conditions for each sensor information and discard the image frame when at least one of at least two types of sensor information satisfies the corresponding discarding condition.

At 202, a current image frame is compared with a previous image frame prior to the current image frame in a video to obtain target block information. Similar to the embodiments described above, the target block information can be obtained by comparing the at least one target block in the current image frame with the at least one target block in the previous image frame.

In some embodiments, target blocks in an image frame are obtained by dividing the contents in the image frame. A target block may either include at least one object or a part of an object, and is determined according to the manner of dividing the image frame. For example, the terminal may perform an equal division operation on the image frame, such as dividing the image frame into M parts in a length direction and equally dividing the image frame into N parts in a width direction, so as to generate M×N target blocks. Alternatively, the terminal may generate target blocks according to an interesting minimum target in the image frame, i.e., each target block includes at least one minimum target. As another example, the terminal may generate target blocks according to the empirical values of developers.

After obtaining the target blocks of the current image frame, the terminal can compare the target blocks in the current image frame with the target blocks in the previous image frame prior to the current image frame to obtain the target block information. The target block information is used to represent changes of the target blocks between two adjacent image frames.

In some embodiments, to obtain the target block information, the target blocks in the previous image frame are compared with the target blocks in the current image frame. If the current image frame includes at least one target block that does not exist in the previous image frame, then each of such at least one target block is designated as a newly-added target block and flag bit information is set for the newly-added target block, to obtain the target block information of each newly-added target block. In some embodiments, the flag bit information is the number of identified keyframes plus 1 (one). On the other hand, if the current image frame includes at least one target block that exists in the previous image frame, then each of such at least one target block is designated as an existing target block and movement information of the existing target block relative to the corresponding target block in the previous image frame is calculated, to obtain the target block information of each existing target block. If the previous image frame includes at least one target block that does not exist in the current image frame, then each of such at least one target block is designated as a disappeared target block, to obtain the target block information of each disappeared target block.

In some embodiments, a target block in the current image frame and the corresponding target block in the previous image frame can be compared by comparing their characteristics using Euclidean distance. The characteristics may be a color histogram or the color histogram plus textural characteristics. The comparison of the target blocks involves three scenarios as noted above, which will be respectively described in more detail below.

In the first scenario, the current image frame includes at least one target block that does not exist in the previous image frame. In this case, the terminal designates such at least one target block as a newly-added target block and sets the flag bit information for the newly-added target block for identification.

In some embodiments, the terminal sets the flag bit information of the newly-added target block to be the number of identified keyframes plus 1 (one). For example, ifs keyframes have been identified before a $k^{th}$ image frame, then flag bit information of the newly-added target block in the $k^{th}$ image frame is set as s+1. If the $k^{th}$ image frame is not a keyframe but the $(k+1)^{th}$ image frame contains a newly-added target block, then the flag bit information of the newly-added target block in the $(k+1)^{th}$ image frame is still set as s+1. That is, the flag bit information of the newly-added target blocks in the image frames between the $s^{th}$ keyframe and the $(s+1)^{th}$ keyframe are all s+1.

In some embodiments, the terminal may also acquire other information, such as position and identity, of the target block, and use the information, such as the identity, the flag bit information, and the position, as the target block information of the newly-added target block.

In the second scenario, the current image frame includes at least one target block that also exists in the previous image frame. In this case, the terminal designates such at least one target block as an existing target block and acquires movement information of the existing target block.

The movement information may include at least one of a movement displacement of the target block in the current image frame relative to the corresponding target block in the previous image frame, the number of moving times of the target block in the current image frame relative to the corresponding target block in the previous image frame, or a movement destination of the target block in the current image frame. The number of moving times refers to the number of times that the target block has moved.

For example, if the movement information includes the movement displacement, assume coordinates of the target block in the previous image frame are (10 cm, 13 cm), and coordinates of the target block in the current image frame are (10 cm, 15 cm), then the displacement of the target block is 2 cm. If the movement information includes the number of moving times, assume the number of moving times of the target block in the previous image frame is 2, and the position of the target block in the current image frame is different from the position of the target block in the previous image frame, then the number of moving times of the target block in the current image frame is determined to be 3. If the movement information includes the movement destination, assume the target block is located in a central area of the current image frame, then the movement destination of the target block is determined to be the central area.

In some embodiments, the terminal may also acquire other information, such as identity and flag bit information, of the target block, and use the information, such as the identity, the flag bit information, and the movement information, as the target block information of the newly-added target block.

In the third scenario, the previous image frame includes at least one target block that does not exist in the current image frame. In this case, the terminal designates such at least one target block as a disappeared target block, and uses the identity, the flag bit information, and the movement information of the target block as the target block information of the disappeared target block.

Referring again to FIG. 2, at 203, the current image frame is identified as a keyframe if the target block information satisfies a predetermined condition.

According to the present disclosure, the terminal can identify the keyframe according to different types of target block information, such as the movement information or the flag bit information.

In some embodiments, the target block information includes the movement information. In this case, the movement information of each existing target block is read from the target block information of the current image frame. The movement information of an existing target block includes at least one of the number of moving times, the movement displacement, or the movement destination of the existing target block. It is then determined whether the number of pieces of movement information that satisfies a movement condition is greater than a predetermined threshold. If so, the current image frame is identified as a keyframe. That is, for a current image frame, if the number of existing target blocks that have movement information satisfying the movement condition is greater than the predetermined threshold, the current image frame is identified as a keyframe. This approach of determining a keyframe is suitable for a scene in which a foreground target is moving and a background changes little, or for a scene in which the background is scaling but there is no foreground target.

Since the movement information may include at least one of the number of moving times, the movement displacement, or the movement destination, different movement conditions correspond to different movement information. For example, if the movement information includes the number of moving times, the movement condition may be that the number of moving times is greater than a times threshold. If the movement information includes the movement displacement, the movement condition may be that the movement displacement is greater than a displacement threshold. If the movement information includes the movement destination, the movement condition may be a destination area. If the movement information includes at least two of the number of moving times, the movement displacement, or the movement destination, the respective movement conditions of different types of movement information may be combined, and the movement information is determined to have satisfied the movement condition when each movement information satisfies the respective movement condition.

For example, if the movement condition is that the number of moving times exceeds 4 and the target area is the central area, then the movement information is determined to have satisfied the movement condition when the terminal detects that the number of moving times recorded in certain movement information is 5 and the movement destination is the central area.

After determining that the movement information satisfies the movement condition, the terminal counts the number of pieces of movement information that satisfies the movement condition and determines whether the number obtained through counting is greater than a predetermined threshold. If the terminal detects that the number obtained through counting is greater than the predetermined threshold, then the terminal determines that the target information of a majority of target blocks in the current image frame has changed relative to the previous keyframe, and thus identifies the current image frame as a keyframe. If the terminal determines that the number obtained through counting is smaller than the predetermined threshold, then the terminal determines that the target information of a minority of target blocks in the current image frame has changed relative to the previous keyframe, and thus does not identify the current image frame as a keyframe.

In some embodiments, the target block information includes the flag bit information. In this case, the flag bit information of each target block is read from the target block information of the current image frame. It is then determined whether there exists flag bit information that is identical to the flag bit information of the disappeared target block. If not, then the current image frame is identified as a keyframe. That is, when certain flag bit information in the image frame completely disappears, the image frame is identified as a keyframe. This approach of determining a keyframe is suitable for a scene in which the background is translating at a predetermined speed and there is no foreground target, or for a scene in which the background is translating at a predetermined speed and there is an unchanged foreground target.

In some embodiments, to determine whether the flag bit information completely disappears, the terminal acquires the flag bit information of the disappeared target block in the current image frame, and determines whether flag bit information identical to the flag bit information of the disappeared target block exists in the flag bit information included in the current image frame. If the terminal determines that no flag bit information identical to the flag bit information of the disappeared target block exists in the flag bit information included in the current image frame, the flag bit information is determined to have completely disappeared. If the terminal determines that flag bit information identical to the flag bit information of the disappeared target block exists in the flag bit information included in the current image frame, the flag bit information is determined to have not completely disappeared.

For an image frame including a person, sometimes an imperceptible posture change of the person needs to be captured. At this time, if the terminal divides the person into target blocks and performs a determination, an important image frame may possibly be incorrectly identified as a non-keyframe due to the imperceptible change of the target block information, which causes loss of important information. Therefore, an approach different from those described above may be employed to determine whether an image frame that contains a person is a keyframe.

According to the present disclosure, if the current image frame includes a person, it is determined whether the posture information of the person in the current image frame has changed relative to the previous image frame, and whether the target block information in the current image frame excluding the person satisfies the predetermined condition. If results of both determines are positive, then the current image frame is identified as a keyframe.

In some embodiments, the terminal separates the person from the background in the current image frame, analyzes the posture of the person, divides the background into target blocks, performs determination according to the target block information, and determines whether the image frame is a keyframe according to the analysis result and the determination result. The posture information of the person includes facial expression or person posture.

The terminal may use different methods to analyze the posture. For example, the terminal can use the Active Shape Model (ASM) algorithm or the Active Appearance Model (AAM) algorithm to position face feature points, extract the features of critical face organs, and classify the features according to the expression. When the terminal determines that the expression classification of the features in the current image frame differs from the expression classification of the features in the previous image frame, it identifies the current image frame as a keyframe. The process of determining the target block information by the terminal is identical to those described above, and thus is not repeated.

In some embodiments, the terminal can identify a keyframe according to sensor information. For example, if the sensor information includes GPS information, the GPS information of the current image frame can be compared with the GPS information of the previous image frame. If a distance between the GPS information of the current image frame and the GPS information of the previous image frame is greater than a GPS threshold, the current image frame is identified as a keyframe.

Referring to FIG. 2, at 204, an image frame next to the current image frame is designated as a new current image frame. The above process described with respect to 202-204 is repeated, until the last image frame in the video has been compared with its corresponding previous image frame. That is, according to the present disclosure, all image frames are subject to the comparison process to extract all the keyframes in the video.

At 205, at least one identified keyframe is played.

In some embodiments, the terminal may also separately store at least one keyframe, and thus convert the video into a short video.

Figure 3:
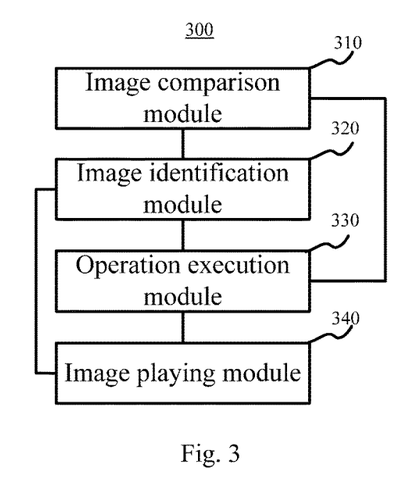
FIG. 3 is a block diagram showing a device for video browsing, according to an exemplary embodiment.

FIG. 3 is a block diagram showing an exemplary device 300 for video browsing consistent with the present disclosure. As shown in FIG. 3, the device 300 for video browsing includes an image comparison module 310, an image identification module 320, an operation execution module 330, and an image playing module 340.

The image comparison module 310 is configured to compare a current image frame with a previous image frame prior to the current image frame in a video to obtain target block information. The target block information is obtained by comparing at least one target block in the current image frame with at least one target block in the previous image frame.

The image identification module 320 is configured to identify the current image frame as a keyframe if the target block information obtained by the image comparison module 310 satisfies a predetermined condition.

The operation execution module 330 is configured to designate an image frame next to the current image frame as a new current image frame, and continue to perform the operation of comparing the current image frame in the video with its corresponding previous image frame prior to the current image frame to obtain the target block information until the last image frame in the video has been compared with its corresponding previous image frame.

The image playing module 340 is configured to play at least one keyframe identified by the image identification module 320.

Figure 4:
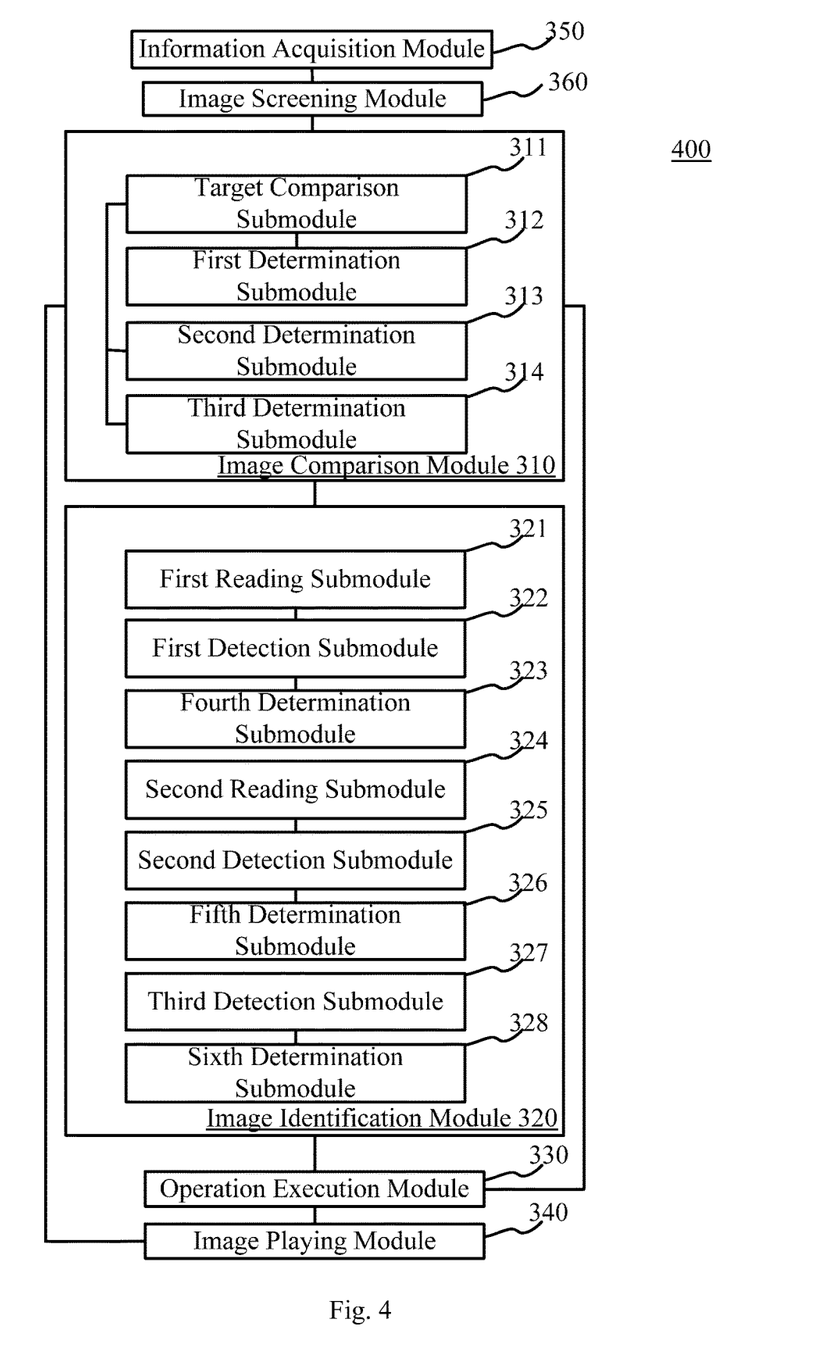
FIG. 4 is a block diagram showing a device for video browsing, according to an exemplary embodiment.

FIG. 4 is a block diagram showing another exemplary device 400 for video browsing consistent with the present disclosure. The device 400 includes the image comparison module 310, the image identification module 320, the operation execution module 330, and the image playing module 340, with modules 310 and 320 being configured as described below.

The image comparison module 310 is configured to compare a current image frame with a previous image frame prior to the current image frame in a video to obtain target block information. The target block information is obtained by comparing at least one target block in the current image frame with at least one target block in the previous image frame.

The image identification module 320 is configured to identify the current image frame as a keyframe if the target block information obtained by the image comparison module 310 satisfies a predetermined condition.

The operation execution module 330 is configured to designate an image frame next to the current image frame as a new current image frame, and continue to perform the operation of comparing the current image frame with its corresponding previous image frame prior to the current image frame in the video to obtain the target block information until the last image frame in the video has been compared with its corresponding previous image frame.

The image playing module 340 is configured to play at least one keyframe identified by the image determination module 320.

In some embodiments, as shown in FIG. 4, the image comparison module 310 includes a target comparison submodule 311, a first determination submodule 312, a second determination submodule 313, and a third determination submodule 314. The target comparison submodule 311 is configured to compare the target blocks in the previous image frame with the target blocks in the current image frame. If the target comparison submodule 311 determines that the current image frame includes at least one target block that does not exist in the previous image, the first determination submodule 312 designates each of such at least one target block as a newly-added target block and sets flag bit information for the newly-added target block, to obtain the target block information of the newly-added target block. The flag bit information is the number of the identified keyframes plus 1 (one). If the target comparison submodule 311 determines that the current image frame includes at least one target block that exists in the previous image frame, the second determination submodule 313 designates each of such at least one target block as an existing target block and calculates movement information of the existing target block in the current image frame relative to the corresponding target block in the previous image frame, to obtain the target block information of each existing target block. If the target comparison submodule 311 determines that the previous image frame includes at least one target block that does not exist in the current image frame, the third determination submodule 314 designates each of such at least one target block as a disappeared target block, to obtain the target block information of each disappeared target block.

In some embodiments, as shown in FIG. 4, the image identification module 320 includes a first reading submodule 321, a first detection submodule 322, and a fourth determination submodule 323. The first reading submodule 321 is configured to read the movement information of each existing target block from the target block information of the current image frame. The movement information includes at least one of the number of moving times, a movement displacement, or a movement destination of the existing target block. The first detection submodule 322 is configured to determine whether the number of pieces of movement information satisfying a movement condition is greater than a predetermined threshold. If so, the fourth determination submodule 323 designates the current image frame as a keyframe.

In some embodiments, as shown in FIG. 4, the image identification module 320 includes a second reading submodule 324, a second detection submodule 325, and a fifth determination submodule 326. The second reading submodule 324 is configured to read the flag bit information of each target block from the target block information of the current image frame. The second detection submodule 325 is configured to determine whether there exists flag bit information that is identical to the flag bit information of the disappeared target block. If not, the fifth determination submodule 326 identifies the current image frame as a keyframe.

In some embodiments, the device 400 for video browsing further includes an information acquisition module 350 and an image screening module 360. The information acquisition module 350 is configured to acquire each image frame in the video and sensor information when shooting the image frame. The sensor information includes at least one of GPS information, acceleration information, or ISO sensitivity information. The image screening module 360 is configured to discard an image frame that does not satisfy a screening condition according to the sensor information and to trigger the comparison between the current image frame and the previous image frame prior to the current image frame in the video to obtain the target block information.

In some embodiments, as shown in FIG. 4, the image determination module 320 includes a third detection submodule 327 and a sixth determination submodule 328. For a current image frame including a person, the third detection submodule 327 is configured to determine whether posture information of the person in the current image frame has changed relative to the previous image frame, and whether the target block information in the current image frame excluding the person satisfies the predetermined condition. If results of both determinations are positive, the sixth determination submodule 328 identifies the current image frame as a keyframe.

With respect to the devices consistent with embodiments of the present disclosure, specific manners for individual modules to perform their operations can be found in the detailed descriptions of the methods consistent with the present disclosure, and thus are omitted here.

Figure 5:
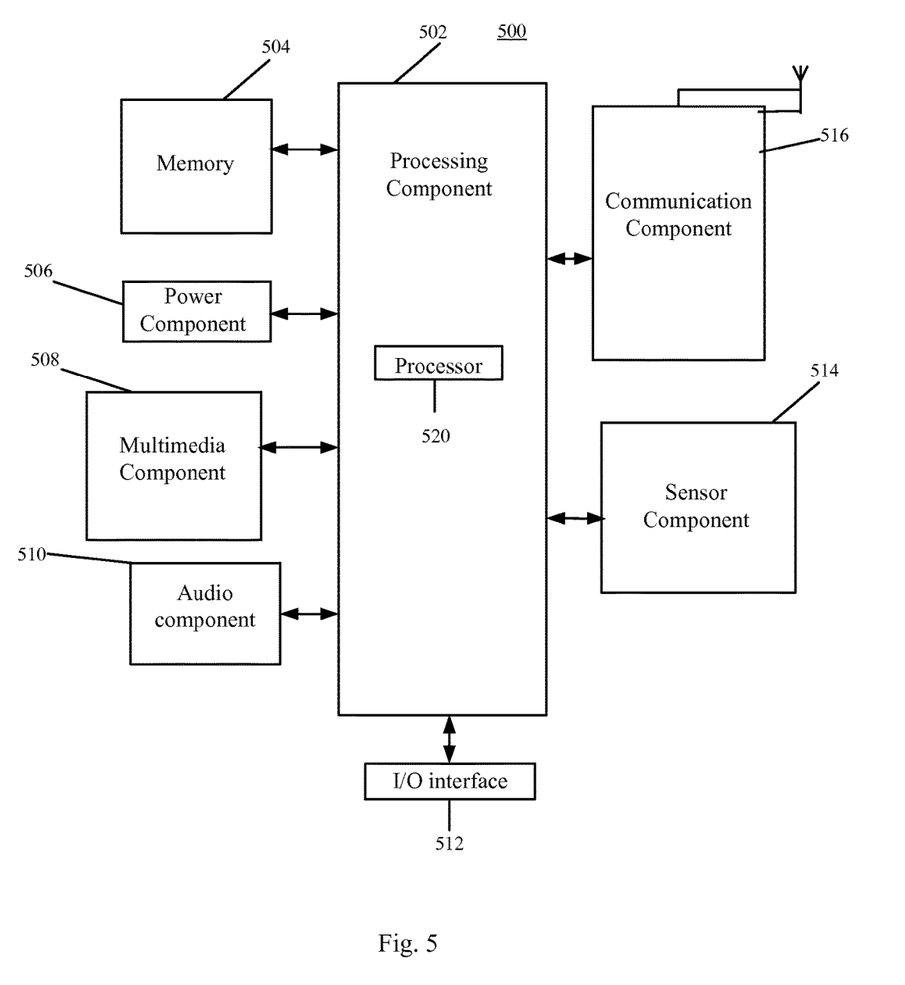
FIG. 5 is a block diagram showing a device for video browsing, according to an exemplary embodiment.

FIG. 5 is a block diagram showing an exemplary device 500 for video browsing consistent with the present disclosure. For example, the device 500 may be a mobile phone, a computer, a digital broadcast terminal, a messaging device, a gaming console, a tablet, a medical device, exercise equipment, a personal digital assistant, or the like.

Referring to FIG. 5, the device 500 includes one or more of a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and/or the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium, such as included in the memory 504, storing instructions executable by the processor 520 in the device 500, for performing the above-described methods. For example, the non-transitory computer-readable storage medium may be a ROM, a RAM, a CD-ROM, a magnetic tape, a floppy disc, an optical data storage device, or the like.

Consistent with embodiments of the present disclosure for video browsing, a current image frame and its corresponding previous image frame in the video are compared to obtain target block information. The current image frame is identified as a keyframe if the target block information satisfies a predetermined condition. That is, according to the present disclosure, the target block information can be obtained by comparing target blocks of neighboring image frames in the video, and then the keyframe can be screened out according to the target block information, without the need to identify the keyframe using a shot boundary. As a result, keyframes can be extracted from a continuous shot for image browsing, and the efficiency of video playing can be improved.

Other embodiments of the present disclosure will be apparent to those skilled in the art from consideration of the description here. The present disclosure is intended to cover any variations, uses, or adaptations of the invention following the general principles thereof and including such departures from the present disclosure within known or customary practice in the art. It is intended that the specification and examples be considered as exemplary only, with a true scope and spirit of the invention being indicated by the following claims.

It should be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for video browsing, comprising:
comparing a current image frame with a previous image frame prior to the current image frame in a video to obtain target block information;
identifying the current image frame as a keyframe when the target block information satisfies a predetermined condition; and
playing the keyframe;
wherein:
the current image frame includes an image of a person, and
identifying the current image frame as the keyframe includes:
determining whether posture information of the person in the current image frame has changed relative to the previous image frame, and whether the target block information in the current image frame excluding the person satisfies the predetermined condition; and
when the posture information has changed and the target block information in the current image frame excluding the person satisfies the predetermined condition, identifying the current image frame as the keyframe.

2. The method according to claim 1, wherein:
the current image frame includes at least one target block, the previous image frame includes at least one target block, and
comparing the current image frame with the previous image frame includes:

comparing the at least one target block in the previous image frame and the at least one target block in the current image frame;
when the current image frame includes a newly-added target block that does not exist in the previous image frame, setting flag bit information for the newly-added target block as the target block information of the newly-added target block, the flag bit information being the number of already identified keyframes plus 1;
when the current image frame includes an existing target block that also exists in the previous image frame, calculating movement information of the existing target block in the current image frame relative to the previous image frame to obtain the target block information of the existing target block; and
when the previous image frame includes a disappeared target block that does not exist in the current image frame, obtaining the target block information of the disappeared target block.

3. The method according to claim 2, wherein:
the current image frame includes at least one existing target block, and
identifying the current image frame as the keyframe includes:
reading the movement information of each of the at least one existing target block from the target block information of the current image frame, the movement information of an existing target block including at least one of the number of moving times, a movement displacement, or a movement destination of the existing target block;
determining whether the number of existing target blocks having movement information satisfying a movement condition is greater than a predetermined threshold; and
when the number of existing target blocks having movement information satisfying the movement condition is greater than the predetermined threshold, identifying the current image frame as the keyframe.

4. The method according to claim 2, wherein identifying the current image frame as the keyframe includes:
reading the flag bit information of each target block from the target block information of the current image frame;
determining whether there exists flag bit information identical to the flag bit information of the disappeared target block; and
when there exists no flag bit information identical to the flag bit information of the disappeared target block, identifying the current image frame as the keyframe.

5. The method according to claim 1, further comprising:
acquiring image frames in the video and sensor information when shooting the image frames, the sensor information including at least one of Global Positioning System (GPS) information, acceleration information, or ISO sensitivity information;
discarding image frames that do not satisfy a screening condition according to the sensor information; and
designating one of remaining image frames as the current image frame.

6. The method according to claim 2, wherein the method further comprises:
acquiring image frames in the video and sensor information when shooting the image frames, the sensor information including at least one of Global Positioning System (GPS) information, acceleration information, or ISO sensitivity information;
discarding image frames that do not satisfy a screening condition according to the sensor information; and
designating one of remaining image frames as the current image frame.

7. The method according to claim 3, wherein the method further comprises:
acquiring image frames in the video and sensor information when shooting the image frames, the sensor information including at least one of Global Positioning System (GPS) information, acceleration information, or ISO sensitivity information;
discarding image frames that do not satisfy a screening condition according to the sensor information; and
designating one of remaining image frames as the current image frame.

8. The method according to claim 4, wherein the method further comprises:
acquiring image frames in the video and sensor information when shooting the image frames, the sensor information including at least one of Global Positioning System (GPS) information, acceleration information, or ISO sensitivity information;
discarding image frames that do not satisfy a screening condition according to the sensor information; and
designating one of remaining image frames as the current image frame.

9. The method according to claim 1, further comprising:
designating an image frame next to the current image frame as a new current image frame; and
repeatedly performing the comparing of the current image frame with its corresponding previous image frame, identifying a keyframe, and designating a new current image frame until a last image frame in the video has been compared with its corresponding previous image frame;
wherein playing the keyframe includes playing at least one of the identified keyframes.

10. A device for video browsing, comprising:
a processor; and
a non-transitory computer-readable storage medium storing instructions that, when executed by the processor, cause the processor to:
compare a current image frame with a previous image frame prior to the current image frame in a video to obtain target block information;
identify the current image frame as a keyframe when the target block information satisfies a predetermined condition; and
play the keyframe;
wherein:
the current image frame includes an image of a person, and
the instructions further cause the processor to:
determine whether posture information of the person in the current image frame has changed relative to the previous image frame, and whether the target block information in the current image frame excluding the person satisfies the predetermined condition; and
when the posture information has changed and the target block information in the current image frame excluding the person satisfies the predetermined condition, identify the current image frame as the keyframe.

11. The device according to claim 10, wherein
the current image frame includes at least one target block, the previous image frame includes at least one target block, and the instructions further cause the processor to:
compare the at least one target block in the previous image frame and the at least one target block in the current image frame;
when the current image frame includes a newly-added target block that does not exist in the previous image frame, set flag bit information for the newly-added target block as the target block information of the newly-added target block, the flag bit information being the number of already identified keyframes plus 1;
when the current image frame includes an existing target block that also exists in the previous image frame, calculate movement information of the existing target block in the current image frame relative to the previous image frame to obtain the target block information of the existing target block; and
when the previous image frame includes a disappeared target block that does not exist in the current image frame, obtain the target block information of the disappeared target block.

12. The device according to claim 11, wherein:
the current image frame includes at least one existing target block, and
the instructions further cause the processor to:
read the movement information of each of the at least one existing target block from the target block information of the current image frame, the movement information of an existing target block including at least one of the number of moving times, a movement displacement, or a movement destination of the existing target block;
determine whether the number of existing target blocks having movement information satisfying a movement condition is greater than a predetermined threshold; and
when the number of existing target blocks having movement information satisfying the movement condition is greater than the predetermined threshold, identify the current image frame as the keyframe.

13. The device according to claim 11, wherein the instructions further cause the processor to:
read the flag bit information of each target block from the target block information of the current image frame;
determine whether there exists flag bit information identical to the flag bit information of the disappeared target block; and
when there exists no flag bit information identical to the flag bit information of the disappeared target block, identify the current image frame as the keyframe.

14. The device according to claim 10, wherein the instructions further cause the processor to:
acquire image frames in the video and sensor information when shooting the image frames, the sensor information including at least one of Global Positioning System (GPS) information, acceleration information, or ISO sensitivity information;
discard image frames that do not satisfy a screening condition according to the sensor information; and
designate one of remaining image frames as the current image frame.

15. The device according to claim 11, wherein the processor is further configured to:
acquire image frames in the video and sensor information when shooting the image frames, the sensor information including at least one of Global Positioning System (GPS) information, acceleration information, or ISO sensitivity information;
discard image frames that do not satisfy a screening condition according to the sensor information; and
designate one of remaining image frames as the current image frame.

16. The device according to claim 12, wherein the processor is further configured to:
acquire image frames in the video and sensor information when shooting the image frames, the sensor information including at least one of Global Positioning System (GPS) information, acceleration information, or ISO sensitivity information;
discard image frames that do not satisfy a screening condition according to the sensor information; and
designate one of remaining image frames as the current image frame.

17. The device according to claim 13, wherein the processor is further configured to:
acquire image frames in the video and sensor information when shooting the image frames, the sensor information including at least one of Global Positioning System (GPS) information, acceleration information, or ISO sensitivity information;
discard image frames that do not satisfy a screening condition according to the sensor information; and
designate one of remaining image frames as the current image frame.

18. A non-transitory readable storage medium storing instructions that, when executed by a processor in a terminal, cause the terminal to:
compare a current image frame with a previous image frame prior to the current image frame in a video to obtain target block information;
identify the current image frame as a keyframe when the target block information satisfies a predetermined condition; and
play the keyframe;
wherein:
the current image frame includes an image of a person, and
the instructions further cause the processor to:
determine whether posture information of the person in the current image frame has changed relative to the previous image frame, and whether the target block information in the current image frame excluding the person satisfies the predetermined condition; and
when the posture information has changed and the target block information in the current image frame excluding the person satisfies the predetermined condition, identify the current image frame as the keyframe.

* * * * *